US007493863B2

(12) United States Patent
Hanssen

(10) Patent No.: US 7,493,863 B2
(45) Date of Patent: Feb. 24, 2009

(54) MOVING PLATFORM

(76) Inventor: Carlos A. Hanssen, 1832 Aspen LN, Weston, FL (US) 33327

( * ) Notice: Subject to any disclaimer, the term of this patent is extended or adjusted under 35 U.S.C. 154(b) by 826 days.

(21) Appl. No.: 11/040,604

(22) Filed: Jan. 21, 2005

(65) Prior Publication Data

US 2005/0156096 A1 Jul. 21, 2005

(30) Foreign Application Priority Data

Jan. 21, 2004 (AR) .............................. P040100167

(51) Int. Cl.
*B60S 13/02* (2006.01)
*B63C 3/00* (2006.01)

(52) U.S. Cl. ......................................... 104/44; 414/678

(58) Field of Classification Search ................... 104/44; 414/678; 187/200-221
See application file for complete search history.

(56) References Cited

U.S. PATENT DOCUMENTS 1,960,871 A * 5/1934 Essex ......................... 187/216
2,011,766 A * 8/1935 Johnston ..................... 187/217
2,015,357 A * 9/1935 Weaver ........................ 269/58
2,135,765 A * 11/1938 Paine .......................... 269/69
2,902,116 A * 9/1959 Ridgeway et al. ........... 187/220
3,583,326 A * 6/1971 Poissant ...................... 104/35
3,844,421 A * 10/1974 Nielsen ...................... 414/678
4,024,960 A * 5/1977 Forster ....................... 414/678
4,434,872 A * 3/1984 Daniels, Jr. ................. 187/220
4,658,933 A * 4/1987 Cheek et al. ................ 187/220
5,015,146 A * 5/1991 Barnes et al. ............... 414/639
5,542,806 A * 8/1996 Kang ......................... 414/422
5,566,783 A * 10/1996 Yamashita .................. 187/210
5,852,978 A * 12/1998 Daschel ....................... 104/44
5,860,491 A * 1/1999 Fletcher ...................... 187/203
5,899,299 A * 5/1999 Chisum ...................... 187/216
6,182,796 B1 * 2/2001 Perlstein et al. ............. 187/208
6,561,750 B1 * 5/2003 Musselman et al. ......... 414/678
7,264,434 B2 * 9/2007 Kozak ........................ 414/672

* cited by examiner

*Primary Examiner*—S. Joseph Morano
*Assistant Examiner*—Jason C Smith
(74) *Attorney, Agent, or Firm*—Sanchelima & Assoc. P.A.

(57) ABSTRACT

A moving platform system with a base firmly anchored to a supporting surface and an upright structural member extending therefrom. A bifurcated arms assembly is mounted to the distal end of the structural member supporting a cross bar assembly. The bifurcated arms assembly includes two outwardly extending arms that support two of the four legs of the cross bar assembly. The other two legs support the platform that in turn supports the object being displayed or used as an entertainment structure. An electric motor is used to provide rotational movement to two wheels of different diameters. The wheels are pivotally connected to linkage arms at an offcentered position that provide the reciprocating sinusoidal movement to the platform with different frequency characteristics.

3 Claims, 4 Drawing Sheets

MOVING PLATFORM

BACKGROUND OF THE INVENTION

1. Field of the Invention

The present invention relates to a system for moving a platform supporting an object, and more particularly, to a system that causes the object to change positions over predetermined periods of time and at a predetermined pace.

2. Other Related Applications

Applicant claims international priority of his Argentina application serial No. P 040100167 filed on Jan. 21, 2004.

3. Description of the Related Art

There are a number of moving platforms for display and other purposes. These platforms are used for marketing purposes primarily. Other moving platform systems are used to provide mechanisms for entertainment rides. The platform assembly in the present invention is unique in that it provides a continuous and periodic sinusoidal movement to a platform thereby causing the latter to continuously move to different positions. These movements can be adjusted for display purposes, such as for displaying an automobile, or for entertainment purposes, for rides and the like.

Other moving platforms existing in the art provide for a number of more or less complicated features that fail to solve the problem in an efficient and economical way. None of these display designs suggests the novel features of the present invention.

SUMMARY OF THE INVENTION

It is one of the main objects of the present invention to provide a moving platform assembly that selectively changes its position to facilitate the viewing of objects supported thereon.

It is another object of this invention to provide a moving platform system with controlled periodic movements to carry structures with riders for entertainment purposes.

It is yet another object of the present invention to provide such a device that is inexpensive to manufacture and maintain while retaining its effectiveness.

Further objects of this invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
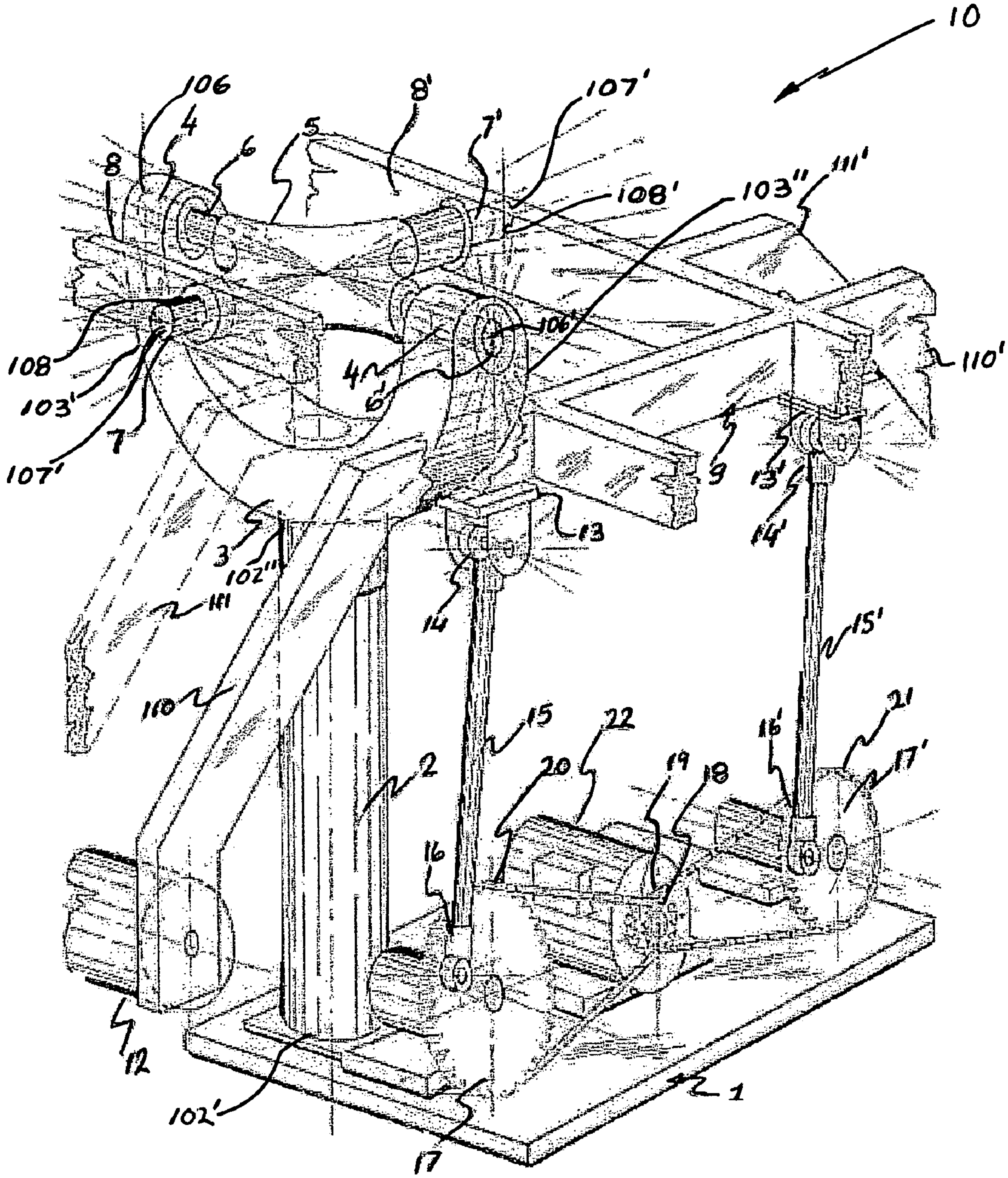
FIG. 1 represents an isometric view of the preferred embodiment for the moving platform, object of the present application.
Figure 2:
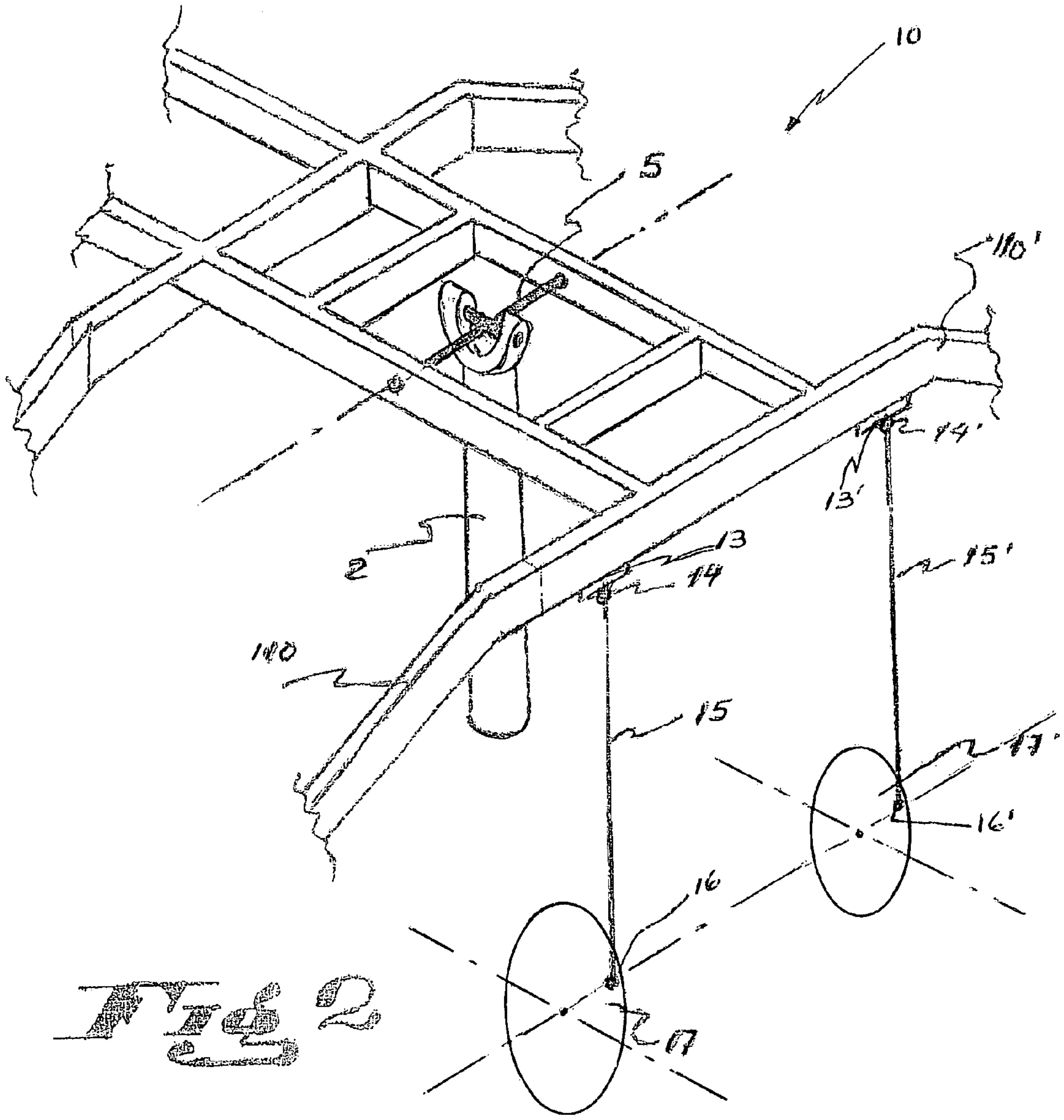
FIG. 2 shows an isometric schematic view of the moving platform, showing the points of where the linking arms are mounted.

Referring now to the drawings, where the present invention is generally referred to with numeral 10, it can be observed that it basically includes base assembly 1 anchored to a supporting surface, elongated structural support member 2 perpendicularly mounted to base assembly 1 at one end and the other end supporting bifurcated arms assembly 3 with bearing assemblies 4 that in turn support ends 6 and 6' of cross bar assembly 5. As seen in FIG. 1, platform assembly 9 includes elongated members 8 and 8' with openings 108 and 108' to receive ends 7 and 7' of cross bar assembly 5. Upper ends articulations 14 and 14' of linking arms 15 and 15' are pivotally mounted to articulation points 13 and 13' on platform assembly 9, away from the center, as shown in FIG. 2. The other ends of linking arms 15 and 15' are pivotally mounted to offcenter points of teethed wheels 17 and 17', which are moved by chains 20 and 21 trained over them, respectively, as best seen in FIG. 1. The movement of chains 20 and 21 is imparted by gear members 18 and 19, respectively, which in turn receive the rotational movement from electric motor 22. The rotation of motor 22 can be in both directions.

Elongated structural support member 2 includes ends 102' and 102". Lower end 102' is mounted to base assembly 1. Supporting bifurcated arms assembly 3 is mounted to upper end 102" of elongated structural support member 2. Supporting bifurcated arms assembly 3 includes arms 103' and 103", with distal arm ends extending outwardly. Arms 103' and 103" include bearing assemblies 4 and 4', respectively.

Cross bar assembly 5 includes legs 6; 6'; 7 and 7' with their corresponding distal ends 106; 106'; 107 and 107'. Legs 6 and 6' are coaxially aligned and distal ends 106 and 106' are rotably mounted to bearing assemblies 4 and 4', respectively, thereby permitting cross bar assembly 5 to rotate about the axis of coaxially aligned legs 6 and 6'.

In the preferred embodiment, counterweight 12 is mounted to a predetermined point of platform assembly 9 through arm members 110; 110"; 111 and 111', as shown in FIG. 1. The length of arm members 110; 110"; 111 and 111' can be adjustable to balance the weight of the object supported by platform assembly 9. The load in counterweight 12 can also be varied depending on the different factors, including the weight of the object carried by platform 9.

Motor 22 includes gears 18 and 19 that transmit their rotational movement to teethed wheels 17 and 17' through chains 20 and 21. Motor 22 imparts periodic reciprocating movements with different frequency to offcentered points on teethed wheels 17 and 17', transmitting the movement to linking arms 15 and 15', thereby providing a periodic sinusoidal movement to platform 9. The ends of linking arms 15 and 15' are pivotally mounted to teethed wheels 17 and 17' and platform assembly 9.

FIG. 4 shows time diagram showing movements of the platform 9 with respect to the position of the teethed wheel (17 or 17') taking as reference only one of the linking arms (15 or 15').

Figure 4A:
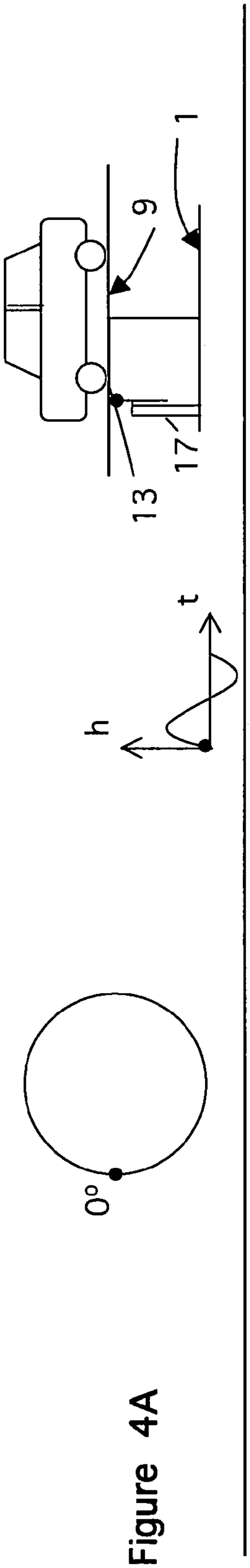
FIG. 4 is a representation of a time diagram showing different positions of the articulation point of the platform with respect to the position of the teethed wheel.
Figure 4B:
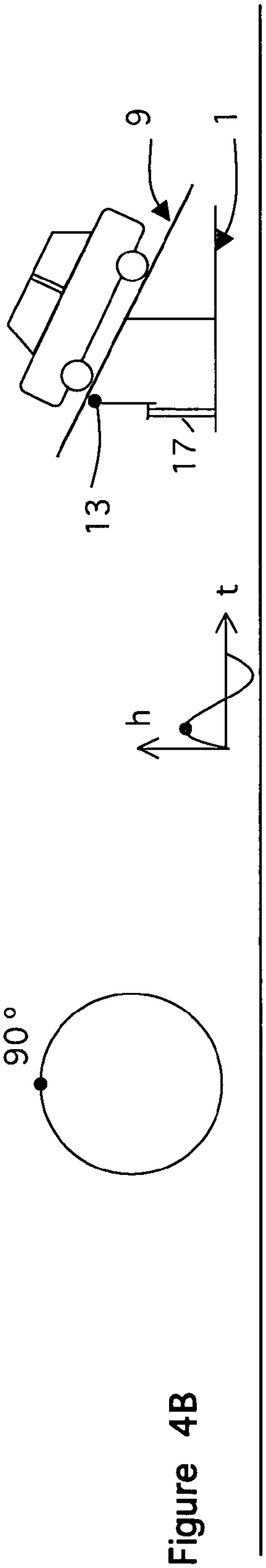
Figure 4C:
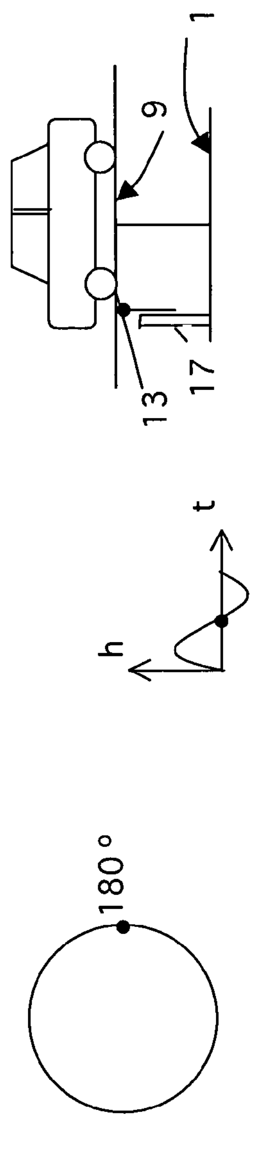
Figure 4D:
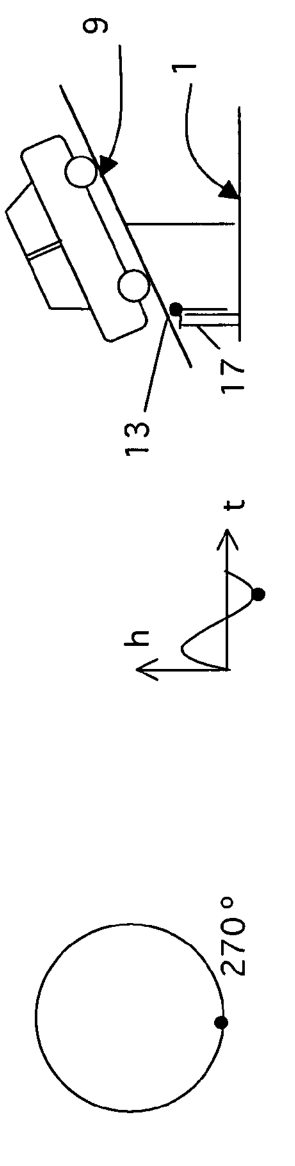

It can be seen that when teethed wheel 17 (or 17') is in the position shown in FIG. 4A, platform assembly 9 is in the horizontal position. As wheel 17 (or 17') turns clock wise, linking arm 15 (or 15') travels upwardly pushing articulation point 13 (or 13') of up to maximum height, as shown in FIG. 4B. In FIG. 4C, platform 9 is back in horizontal position. Finally, in FIG. 4D, articulation point 13 (or 13') reaches its lowest position. These positions are periodically visited by articulation point 13 (or 13') and over time they can be represented with a sinusoidal function.

The points between articulated points 13 and 13' are a function of their respective sinusoidal movements. The closer a given point is to point 13 and 13', the closer it will resemble the latter's sinusoidal movement. When the pivoting point of linking arms 15 and 15' on wheels 17 and 17' is the same, the reciprocal movements of the former are identical. When the pivoting points are different, two different sinusoidal movements result and different periodic movements result for other points in between. These movements permit viewers to see the objects at different angles. Another application is for entertainment rides and the movements can be varied in speed to make them more exciting.

The speed of linking arms 15 and 15' can be independently varied by changing the position of the pivoting connection to teethed wheels 17 and 17', respectively. Additionally, the speed of teethed wheels 17 and 17' can be varied with the speed of motor 22. Finally, the direction of rotation of said motor 22 can be selectively reversed.

Figure 3:
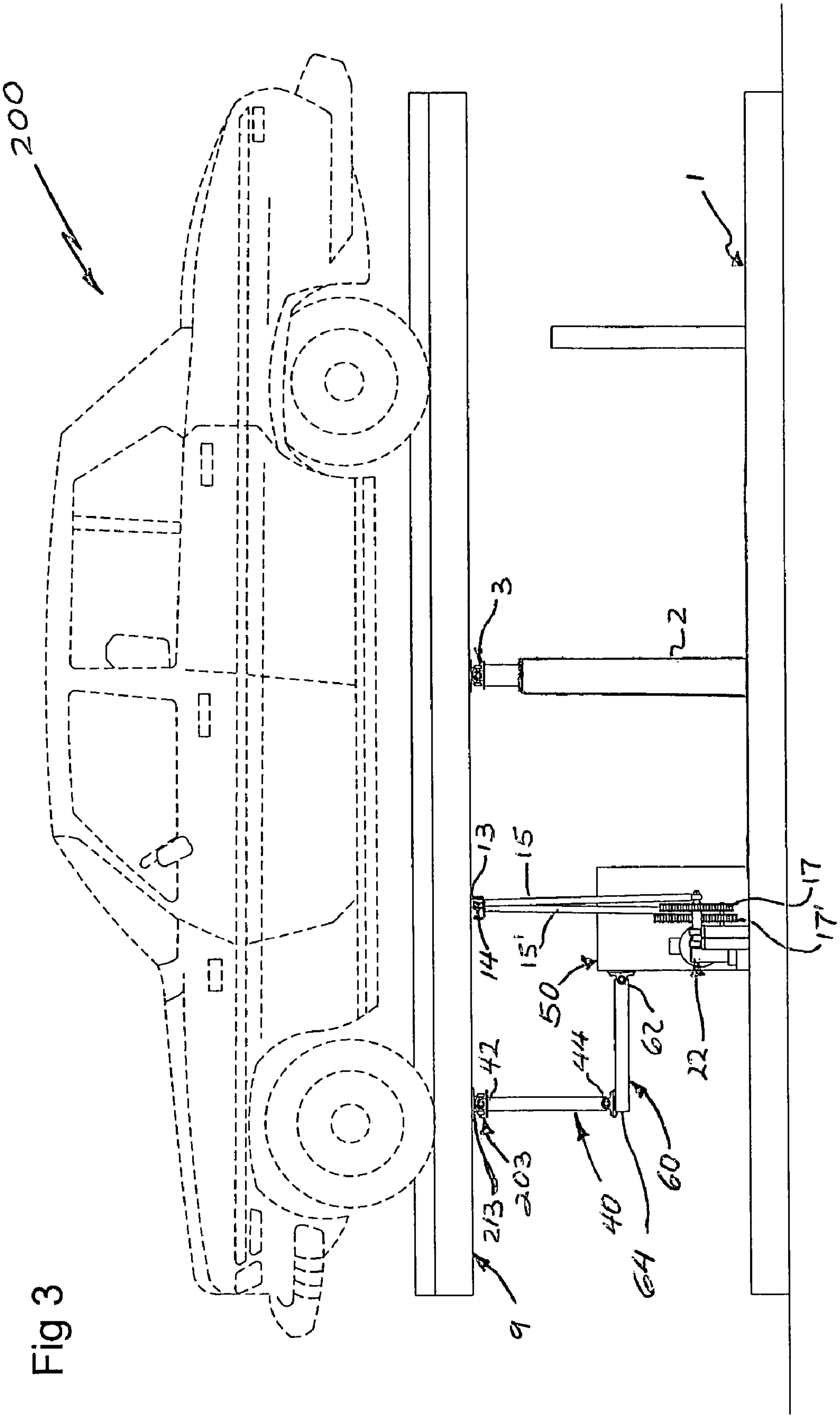
FIG. 3 illustrates an isometric view of an alternate embodiment for the moving platform, wherein the counterweight has been replaced with a hingedly mounted arm to provide more stability.

Another embodiment for the moving platform 200 is shown in FIG. 3 where counterweight 12 is replaced with stabilizing arm members 40 and 60. Stabilizing arm member 40 includes articulated ends 42 and 44. Stabilizing arm member 60 includes articulated ends 62 and 64. Articulated end 42 is pivotally mounted to offcentered point 213 in platform 9. Articulated end 44 is pivotally mounted to articulated end 64 of stabilizing arm member 60. Articulated end 62 is pivotally mounted to fixed structure 50 so that another stabilizing point is added to the structure to prevent lateral movement. Supporting bifurcated arms assembly 203 could be used to mount articulated end 42 to offcentered point 213 in platform 9.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A moving platform system, comprising:

A) a base assembly anchored to a supporting surface;

B) elongated structural means having first and second ends, said first ends being mounted to said base assembly:

C) a bifurcated arms assembly mounted to said second ends, said bifurcated arms assembly including first and second arms extending outwardly with distal arm ends with each including bearing means;

D) a cross bar assembly with first, second, third and fourth legs, each having distal leg ends, and said first and second legs being coaxially aligned, with their respective distal legs being rotably mounted to said bearing means thereby permitting said cross bar assembly to partially rotate about a longitudinal axis defined by said coaxially aligned first and second legs;

E) platform means pivotally mounted to said distal leg ends of said third and fourth legs thereby permitting said platform means to partially rotate about a transversal axis defined by said coaxially aligned third and fourth legs and said transversal axis dividing said platform in first and second portions;

F) means for imparting two periodic reciprocating movements with different frequency to two different offcentered points located on said first portion on said platform means thereby providing a periodic continuous movement to said platform means wherein said means for imparting at least two periodic reciprocating movements includes at least two wheels with linking arms having first and second ends pivotally mounted to said wheels and said platform means and electric motor means to provide rotational movement to said wheels wherein the speed of said linking arms can be independently varied by changing the position of the pivoting connection to said wheels; and G) adjustable counterweight means mounted to said platform at predetermined positions.

2. The moving platform set forth in claim 1 wherein the speed of said wheels can be varied with the speed of said motor means.

3. The moving platform set forth in claim 2 wherein the direction of rotation of said electric motor means can be selectively reversed.

* * * * *